June 15, 1965 E. A. SALNERS 3,189,000

SIGNAL GENERATOR

Original Filed July 15, 1960 3 Sheets-Sheet 1

INVENTOR.
Edward A. Salners
BY Mueller & Aichele
Attys.

June 15, 1965 E. A. SALNERS 3,189,000

SIGNAL GENERATOR

Original Filed July 15, 1960 3 Sheets-Sheet 2

INVENTOR.

Edward A. Salners

BY Mueller & Aichele

Attys.

INVENTOR.
Edward A. Salners
BY Mueller & Aichele
Attys.

United States Patent Office 3,189,000

Patented June 15, 1965

3,189,000

SIGNAL GENERATOR

Edward A. Salners, Mount Prospect, Ill., assignor to Motorola, Inc., Franklin Park, Ill., a corporation of Illinois Continuation of application Ser. No. 43,234, July 15, 1960. This application Jan. 8, 1964, Ser. No. 340,581
9 Claims. (Cl. 116—137)

This invention relates to signal generator apparatus and more particularly to the striker mechanism for a mechanical signal generator having advantageous use in a transmitter of sonic signals. This application is a continuation of application Serial No. 43,234, filed July 15, 1960, now abandoned.

It has long been known to perform remote control functions by transmitting sound energy and then remotely receiving the energy to operate relay control circuits. For example, in the past there has been remote control of garage doors or the tuning of radio receivers in this manner. Remote control of television receivers has also commonly been accomplished with sound energy and this type of a control system has achieved some popularity for the channel selection, the on-off and the volume control receiver adjustments which can all be carried out from the viewer's position by means of such remote control apparatus.

However, mechanical sound generators previously known have been subject to objections from the standpoint of providing sufficient power output while still retaining desirable smooth and easy operation to have wide user appeal. In addition the prior art striker mechanisms for such generators or transmitters often require many critical specifications, some of which necessitate special assembly procedures thus tending to add to the manufacturing cost.

While high strength or amplitude of the energy burst is desirable from the viewpoint of extending the distance over which control is possible, a short duration or pulse-like quality of the energy burst may be necessary so that the transmitter will not continue to radiate the signal to operate the remote control receiver when the receiver would otherwise be tending to stop the remote control function. In other words, rapid damping of the controlling signal once it is generated may be necessary to prevent overshooting of the remote control apparatus.

An object of the invention is to provide an improved compact signal generator device requiring relatively few non-critical parts to reduce the cost and expense of manufacture thereof.

Another object is to provide a manually operable signal generator which is spring actuated to furnish a strong, short sonic energy pulse and which has desirably long spring life.

A still further object is to provide a supersonic signal generator having rapidly effective damping of a vibratory radiator therein to limit the duration of the signal output.

A still further object is to increase the smoothness and improve the "feel" of a manually operable, self-cocking trigger mechanism.

A feature of the invention is the provision of a striker mechanism having a movable actuator for cocking and releasing a spring biased pivotally and slidably mounted rocker which carries a striker, for improved striking action with reduced spring fatigue and smoother resetting of the mechanism upon pivoting and sliding action of the rocker-striker.

A further feature is the provision of a sonic signal generator with a rocker having a striker for a signal radiator and which rocker is pivotal about a first point by operation and release of an actuator for cocking and striking the radiator and which rocker is further pivotal about a second point and slidable about the first pivot point upon return of the actuator for moving the striker into engagement with the radiator for damping of the radiator vibration.

In a particular form the invention comprises a sonic signal generator with an improved manually operable striking mechanism. A sonic radiator is mounted to be impinged by a striker which is carried by a pivotally and slidably mounted lever or rocker. A spring biased actuating lever is operable to pivot the rocker against an actuator spring, and upon sufficient travel of the actuating lever it becomes disengaged from the rocker to permit the actuator spring to urge the striker into sharp engagement with the radiator. A reverse bias spring is used to limit the striker to one blow and to retain the striker spaced from the radiator after the blow is struck. The actuator spring may be an end mounted flat spring carrying a small stud engageable with the rocker or an axle mounted coil spring engageable with the rocker. Upon return movement of the actuating lever, as it is released, the actuating lever re-engages the rocker which then slides in its mounting to pivot upon its actuator spring and move the striker into engagement with the radiator for damping its vibration and stopping the signal output. Provision may also be made for maintaining the striker in engagement with the radiator continuously upon release of the pushbutton so complete damping is automatic by actuating lever return travel.

Figures 1, 2:
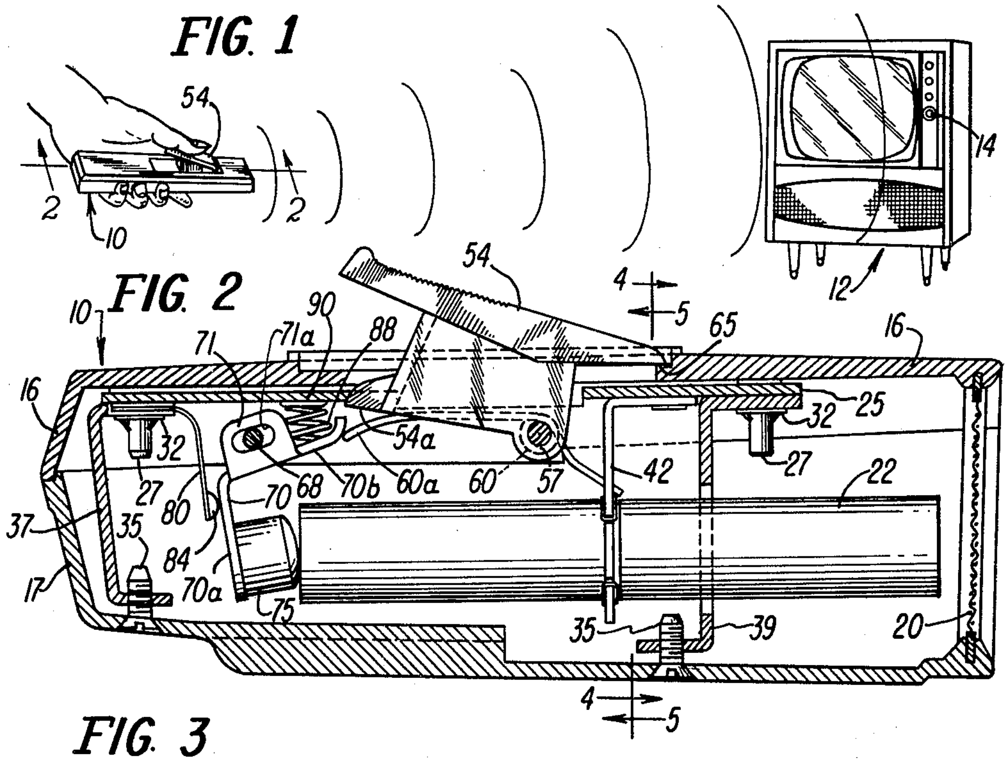
FIG. 1 is a perspective view showing the signal generator incorporaing the invention as it may be used for remote control of a television receiver.
FIG. 2 is a side elevational view of the signal generator with the housing therefor taken in section along the line 2—2 of FIG. 1 to show the striker mechanism.

In FIG. 1 there is shown the hand held signal generator 10 which is operative to emit a supersonic signal, for example, in the range of 40 kilocycles, for remote control of the television receiver 12. The receiver 12 includes on its front panel a microphone 14 which is connected to suitable amplifier, detector and relay circuits (not shown) for electrical operation of a control motor or other control performing means. For example, the receiver 12 may include a motor for driving a tuner of the receiver thus permitting remote station selection. Obviously, other control functions may be performed and the control arrangement shown is merely by way of example.

*Signal generator construction*

FIGS. 2–5 show various views of the internal construction of the transmitter or signal generator 10. The device includes an upper housing portion 16 and a lower housing portion 17 with a protective screen 20 enclosing the open end of the device. Sound waves are emitted through the screen 20 and these are generated by means of longitudinal resonant vibration of the sonic radiator or rod 22.

Figure 3:
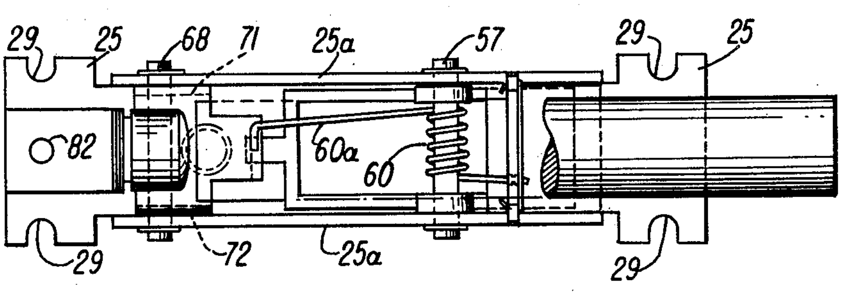
FIG. 3 is a bottom view of the striker mechanism of FIG. 2.
Figure 4:
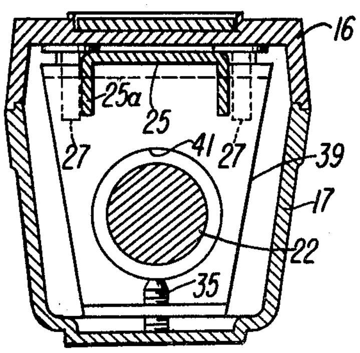
FIG. 4 is a sectional view along the line 4—4 of FIG. 2.
Figure 5:
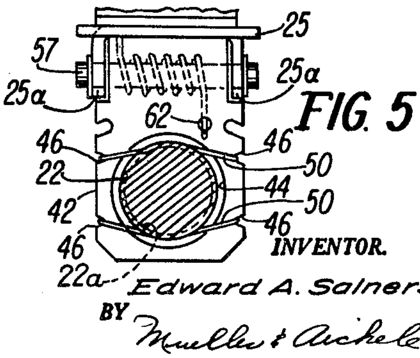
FIG. 5 is a sectional view along the line 5—5 of FIG. 2.

A frame 25 supports the various operative components of the signal generator and this frame is secured to the upper housing portion 16 by means of four depending studs 27 engageable with the four rounded notches 29 adjacent the four corners of frame 25 (FIG. 3). Frame 25 is clamped by means of suitable friction nuts 32 (FIG. 2) engaging studs 27.

The lower housing portion 17 is held in place by means of threaded fasteners 35 which are secured to the rear bracket 37 and the forward bracket 39. Brackets 37 and 39 are also retained by pairs of the studs 27 and the associated friction nuts 32. Bracket 39 includes an aperture 41 through which the rod 22 extends. The further support bracket 42 is fastened to frame 25 and this extends at right angles to the frame and includes an aperture 44 (FIG. 5) through which the radiator rod 22 extends. Bracket 42 has notches 46 in pairs spaced upon each side of the aperture 44 and spaced apart a distance less than the diameter of the rod 22. A supporting wire 50 is disposed in notches 46 and this wire includes two portions extending across the aperture 44 in order to engage an annular groove **22*a* at the center of rod 22. In this way, rod 22** is suspended at its center, or a nodal point for its vibration, so that there is minimum damping of its resonant vibrations when it is energized.

A manually operable actuating lever 54 projects outwardly of the housing portion 16 so that it may be conveniently depressed to operate the striker mechanism through the operative cycle of cocking, release and impingement of the resonant rod, and then damping of the resonant rod when the actuating lever 54 is released. As shown best in FIGS. 3–5 and 7, the frame 25 includes two depending sides **25*a* and these form a channel shaped frame portion for pivotal mounting of the striker components. An actuating lever mounting axle pin 57 is rotatably supported in apertures of the sides 25*a* at a position spaced from rod 22 and intermediate the ends thereof. Actuating lever 54 is rotatably mounted on pin 57 and a coil spring 60 surrounds this pin. Spring 60 includes one free end captured in aperture 62 of bracket 42 (FIG. 5) and a second free end 60*a* engageable with the bottom side of actuating lever 54 to bias this in a clockwise direction. Spring end 60*a* also engages arm 70*b* to bias rocker 70 so that striker 75 is engaged with the end of rod 22. Actuating lever 54 is restrained against undue clockwise rotation because of the engagement of the bottom of the forward edge thereof with the housing portion 16 along the area 65** (FIG. 2).

Figure 7:
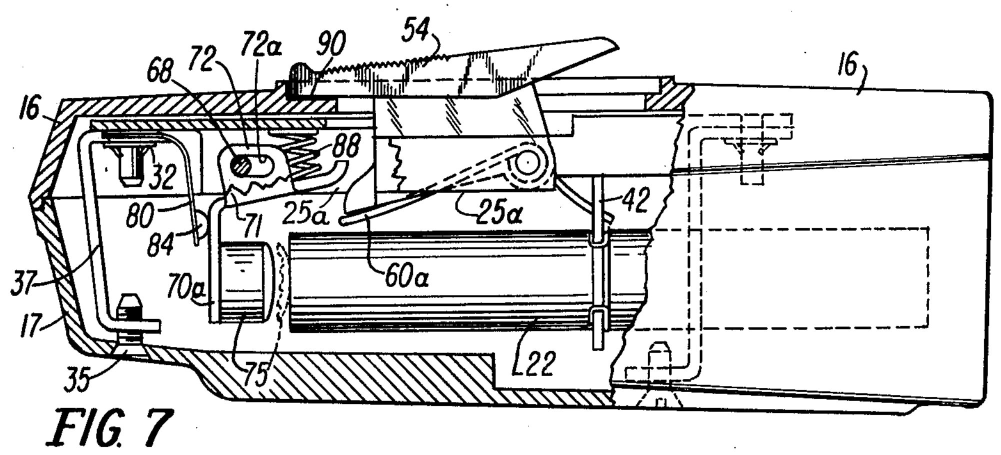
FIG. 7 is a view like that of FIG. 6 but after the striker mechanism has been released.

The rocker mounting axle pin 68 is supported in apertures of the sides **25*a* of frame 25 at a position spaced rearwardly of the rod 22 (FIG. 2). The lever or bent rocker 70 includes two outwardly turned ears 71 and 72 (FIGS. 3 and 7) each having aligned slots 71*a* and 72*a* for rotatably and slidably mounting the rocker 70 on pin 68. Slot 71*a* is illustrated in FIG. 2 and slot 72*a* is shown in FIG. 7. These slots are in alignment along the axis of pin 68, which pin is spaced rearwardly of the striking surface of rod 22**.

The bent rocker 70 includes an arm **70*a* extending generally transverse to rod 22 and spaced rearwardly of the pin 68 with respect to the end of the rod 22. Arm 70*a* carries a sound activator hammer or striker 75. Striker 75 is mounted on arm 70*a* so as to be in alignment with the end of rod 22**.

Bent rocker 70 also includes a tripping arm **70*b* which joins arm 70*a*** at slightly more than a right angle.

An end mounted spring strip forms an actuator spring 80 which is used to provide the energy for operating the striker 75. Spring 80 is bent at somewhat more than a right angle and is mounted at one arm to the frame 25 by means of a rivet 82 (FIG. 3). The other arm of spring 80 supports a rounded nylon button 84. Button 84 engages the arm **70*a* of rocker 70 at a point slightly spaced from the intersection of arms 70*a* and 70*b* and remote from end of arm 70*a*. A coil spring 88 is compressed between the frame 25 and the arm 70*b* to force rocker 70 back against the nylon button 84, and spring end 60*a* will force arm 70*b* to maintain some compression of spring 88. Spring 88 is restrained from sliding movement along the frame 25 by means of an outward projection or pimple 90. However, spring 88 is slidable to a limited extent along the arm 70*b* of rocker 70** during operation of the device as will be explained subsequently.

*Signal generator operation*

As the signal generator is shown in FIG. 1 it is in a position of rest prior to actuation. The untensioned condition of spring 80 is such that spring end **60*a* merely pivots the rocker 70 in a counter clockwise direction against the button 84 without substantially tensioning spring 80. This has the purpose of placing striker 75 against the end of rod 22. The coil spring 88 is relatively weak and spring 80 is relatively strong so spring 88 will be slightly compressed. In this condition rocker 70 may be positioned so the pivotal mounting pin 68 is intermediate the slots 71*a* and 72*a*** as illustrated.

Figure 6:
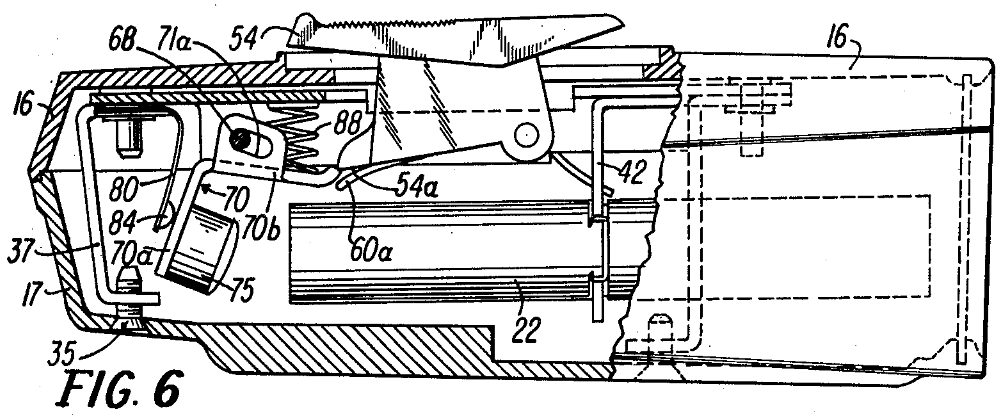
FIG. 6 is a side elevational view of the signal generator of FIG. 2 with the housing partly cut away and with the striker mechanism fully cocked but prior to release thereof.

As shown in FIG. 6, upon sufficient counter clockwise manual operation of the actuating lever 54, the projection **54*a* of actuating lever 54 is engageable with the top surface of the arm 70*b* to cause clockwise pivotal movement of rocker 70 against the spring 80 to store energy in that spring. Spring end 60*a* will disengage arm 70*b* but spring 60 will maintain a reaction force to pushbutton operation. It may be noted that arm 70*b* is inclined upwardly toward projection 54*a* in order to reduce the stroke necessary in operating actuating lever 54. The bottom surface of projection 54*a* and the facing surface of the arm 70*b* are both flat so that as these surfaces engage, the movement applied to the rocker 70 is entirely counter clockwise and any radial force is away from the pin 68 to prevent any undesirable sliding movement of the rocker 70**.

As the actuating lever 54 is pivoted counter clockwise beyond the position shown in FIG. 6, the projection **54*a* and the arm 70*b* become disengaged as their respective arcuate paths of travel diverge, and the rocker is then released from its fully cocked position. The condition shown in FIG. 7 illustrates the subsequent continued movement, or manually produced overtravel, of the pushbutton wherein the bottom of its rear surfaces engages the surface 90 of upper housing portion 16 to act as a stop for the pushbutton. FIG. 7 also illustrates the condition wherein the rocker 70 has been driven by spring 80 from the position shown in FIG. 6 to a position of overtravel of the rocker as it is illustrated in FIG. 2 such that the hammer 75 strikes the end of rod 22 a sharp percussive blow. In this way the energy stored in spring 80 is released through the momentum of hammer 75 to the rod 22** to cause this rod to longitudinally vibrate at its supersonic resonant frequency.

It is preferable that the hammer 75 make only a single contact with the rod 22 and that the hammer be immediately withdrawn after initial contact to permit free vibration of the rod 22. In its rebound after contact with the rod, hammer 75 causes the rocker to move against spring 80 which absorbs some of the rebound energy. Spring 88 absorbs more of the energy as the hammer may again move toward the rod. Accordingly, by proper tensioning of the springs 80 and 88 and by the proper spacing between the hammer 75 and rod 22 as shown in FIG. 2, it is possible to provide a single impact between the hammer and the rod.

Figure 8:
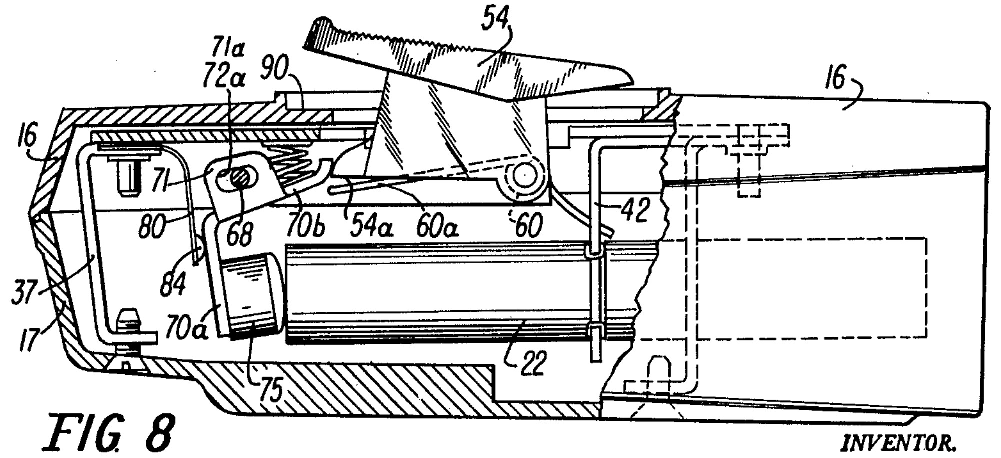
FIG. 8 is a view like that of FIG. 6 but during the resetting of the striker mechanism and simultaneous damping of the sonic radiator.

Once the actuating lever 54 has been operated to cause cocking and release of the rocker it is necessary to release the manual pressure on the actuating lever (FIG. 1) to permit the spring 60 to return the mechanism to the condition shown in FIG. 2. FIG. 8 illustrates the operation of the striker mechanism as the rocker 70 slides in its mounting during the return portion of the operating cycle. The top surface of projection **54*a* and the bottom surface of the end of arm 70*b* are both rounded to reduce the frictional contact as the actuating lever 54 returns to its normal position. It may also be noted that the contact between projection 54*a* and arm 70*b* is made substantially along the axis of the slots 71*a* and 72*a* (which axis is substantially aligned with the pivot pin 57 for the actuating lever), and that the projection 54*a* is moving substantially at right angles to the axis of these slots. Accordingly, the rocker 70 is driven in a direction away from the striking surface of rod 22** to facilitate this reset movement.

Further considering FIG. 8, it may be noted that the button 84 is engageable with the arm **70*a* at a point between the position of hammer 75 and the pin 68. Since the spring 80 is relatively stiff and the button 84 has a rounded surface engaging the arm 70*a*, the button 84 forms a pivot point such that the rocker 70 pivots slightly counter clockwise about this button and the hammer 75 is forced into engagement with the end of rod 22. Since rod 22 is constructed to vibrate longitudinally at its resonant frequency, touching an end thereof has the effect of greatly damping and stopping the generation of a signal by this rod. As has been previously mentioned, this damping of the output signal of the generator apparatus is desirable in some control applications to prevent overshoot of the apparatus which is controlled by the signal. Thus, it may be seen that by rapid release of the actuating lever 54 after it has once been operated, it is possible to immediately and fully damp the rod 22 in order to produce an overall output signal which is pulse-like, or of short duration. Obviously, as spring 60 forces actuating lever 54 further clockwise in FIG. 8, projection 54*a* and arm 70*b* disengage and spring end 60*a* engages arm 70*b* to maintain damping of the rod by hammer 75** as shown in FIG. 2.

Figure 9:
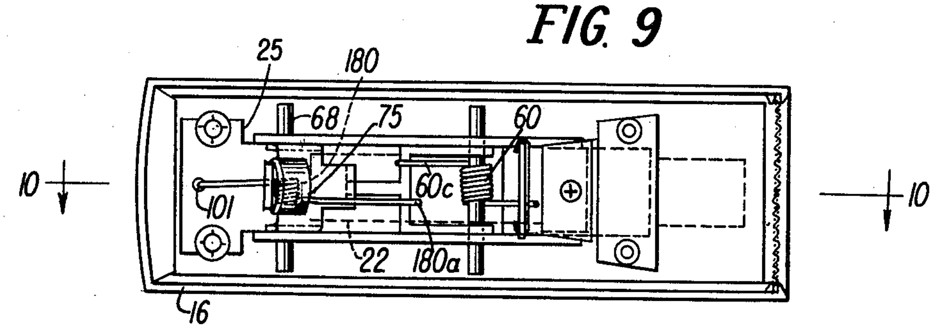
FIG. 9 is a bottom view of a modified form of the striker mechanism.
Figures 10, 11, 12, 13, 14:
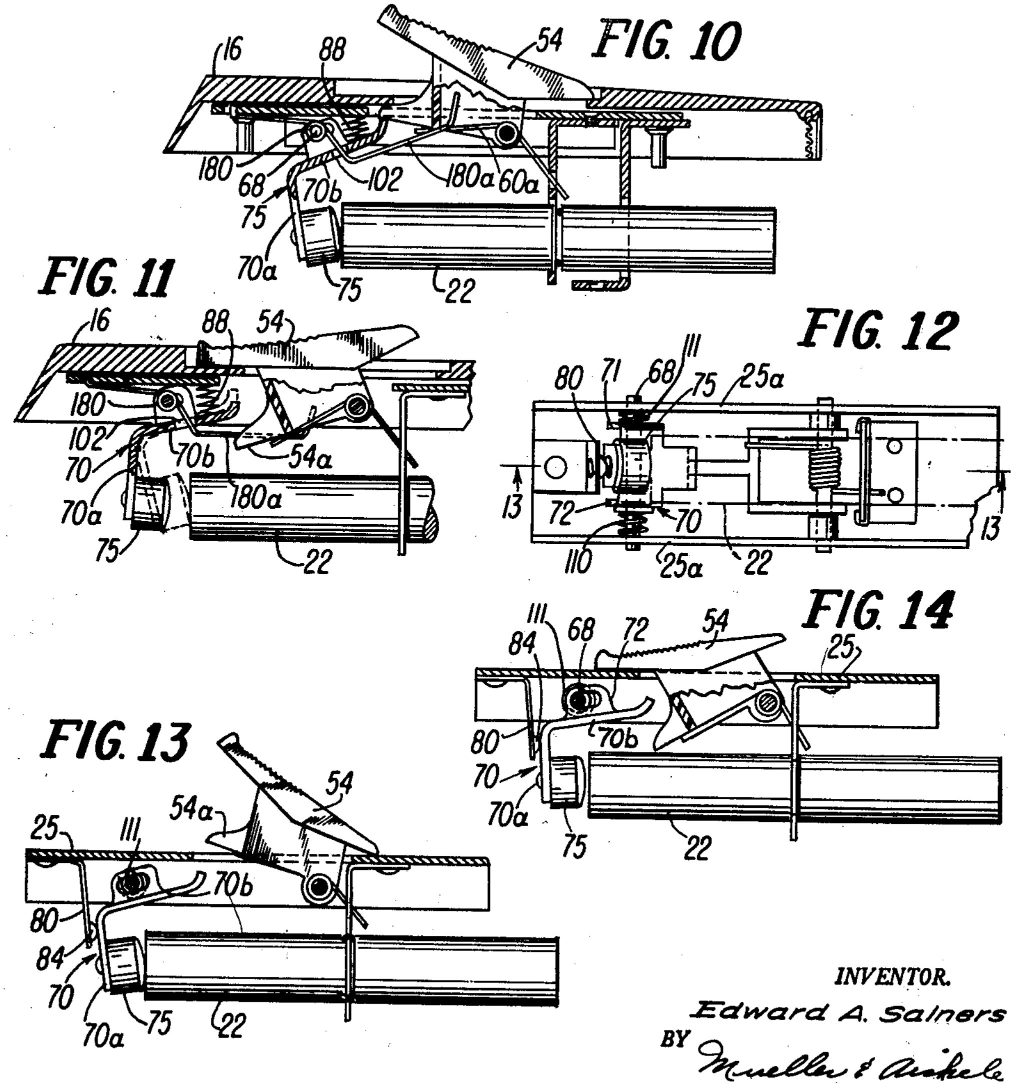
FIG. 10 is a sectional view along the line 10—10 of FIG. 9.
FIG. 11 is a partial view similar to FIG. 10 but with the pushbutton depressed and the striker mechanism in operation.
FIG. 12 is a bottom view of a still further embodiment of the striker mechanism.
FIG. 13 is a sectional view along the line 13—13 of FIG. 12.
FIG. 14 is a view similar to FIG. 13 but with the pushbutton operated.

*Embodiments of FIGS. 9–11*

FIGS. 9, 10 and 11 shows a slightly modified form of the signal generator apparatus in which the generator is shown with the lower housing portion removed. In this form, the striker spring is a coil spring and provides the continued damping action of the rod 22 by hammer 75. As seen in FIG. 9, the spring end **60*c* extends only far enough to engage the underside of actuating lever 54 and bias this in a clockwise direction (FIG. 10). A coil spring 180 is positioned on the mounting pin 68 and one end of this spring is extended and anchored in aperture 101 of frame 25. The other end 180*a* of coil spring 180 is extended through an aperture 102 in the rocker arm 70*b* and this spring end is bent to engage the underside of actuating lever 54. A further tip of the spring end 180*a* is bent upwardly within the interior of the underside of actuating lever 54** (FIG. 10).

Prior to actuation and as shown in FIG. 10, the spring arm **180*a*, as it extends through aperture 102, tends to bias rocker 17 in a counter clockwise direction and against the coil spring 88 so that hammer 75 is engaged with the end of rod 22. As actuating lever 54 is depressed the projection 54*a* engages arm 70*b* to pivot the rocker in a clockwise direction against the action of spring 180. Upon sufficient movement of the actuating lever 54 the projection 54*a* will disengage the arm 70*b* to permit the spring 180 to release its energy and drive the rocker 70** in a counter clockwise direction as illustrated in FIG. 11. The operation of the pushbutton and movement of the rocker for striking action is similar to that described previously in connection with FIGS. 2 and 6.

In the embodiment shown in FIGS. 9–11, the operation differs over the previously described embodiment in the manner in which continued damping of the rod 22 is obtained. As shown in FIG. 11, when the actuating lever 54 travels sufficiently to release the rocker 70, the spring arm **180*a*, extending through aperture 102, provides the necessary mechanical connection between the rocker 70 and coil spring 180 to drive the striker into sharp engagement with the rod 22. At this time spring 88 is compressed and this spring then tends to force the rocker 70 in a counter clockwise direction and away from the dotted line position illustrated in FIG. 11. The aperture 102 is made large enough that with the actuating lever 54 depressed as shown in FIG. 11, and the spring arm 108*a* engageable with the bottom side of the pushbutton 54, the spring 88 will bias the rocker 70 in a counter clockwise direction after a single blow of the hammer 75. That is, the size of aperture 102 permits a free return of the rocker 70 to the solid line position shown in FIG. 11 due to the action of spring 88. Accordingly, as projection 54*a* disengages the arm 70*b* in the initial operation of actuating lever 54, the spring 180 is permitted to release its energy to the rocker 70, at which time the actuating lever 54 engages the spring arm 180*a* as the energy of spring 180 is imparted to provide clockwise movement of rocker 70. The movement of the rocker 70 is sufficient to permit overtravel and engagement of the striker 75 with the rod 22, and upon rebound of the striker 75 from the end of the rod, the spring 88 limits the striker to one blow while the actuating lever 54 maintains the spring 180 out of operation by engagement with the spring arm 180*a***.

Upon return movement of the actuating lever 54 the operation is similar to that illustrated in FIG. 8. There is sliding movement of the rocker 70 to the left in its mounting, and pivotal action thereof about the arm **180*a* extending through the aperture 102 provides engagement of the striker 75 with the rod 22 for damping action. The slots in the ears of rocker 70 permit sufficient sliding of the rocker for clearance of the projection 54*a*, and the spring arm 180*a* will maintain the proper counter clockwise bias to the rocker 17 so that striker 75 will continuously contact the end of rod 22** as the pushbutton is being returned to the condition of rest illustrated in FIG. 10.

*Embodiments of FIGS. 12–14*

In FIGS. 12–14 there is shown a form of the signal generator (with the housing removed) which operates much like that shown in FIGS. 2–8 except that spring 88 has been omitted and a slight friction has been incorporated in the pivotal mounting of the rocker 70 to provide proper striking of the rod 22, and continuous damping of the rod upon release of the pushbutton. As shown in FIG. 12, coil springs 110 and 111 are installed in compressive relation respectively between the ear 72 and frame side **25*a* and the ear 71 and frame side 25*a*. Furthermore, the flat spring 80 used to energize the rocker 70 and striker 75 is set so that it is not tensed, with the button 84 engaging arm 70*a* and the hammer 75 spaced from the end of rod 22 in a position of rest for the rocker arm 70 as shown in FIG. 14. In this instance the rocker 70 will be positioned so that pin 68 is engaged with the outward portion of the slots in the ears 71, 72 (as shown in FIG. 14), and the friction imparted to the movement of rocker 70 by springs 110 and 111** will be sufficient to maintain the rocker in the position shown.

For operation of the device as shown in FIGS. 12–14, actuating lever 54 will be depressed with the apparatus in the condition shown in FIG. 13, and the rocker 70 will be pivoted against the nylon button and spring 80 until the projection $54a$ releases from arm $70b$ and the energy of the spring 80 is released to provide striking action of the striker 75 against the end rod 22. Because of the great force with which the hammer 75 is struck against the rod, the hammer will rebound as shown in FIG. 14 and there is sufficient friction on the rocker to prevent any further striking action because of the action of springs 110 and 111. As the actuating lever 54 is released from the position shown in FIG. 14, the rocker 70 will slide in the slot in the ears 71 and 72 and will pivot about the button 84 to bring the hammer into engagement with the end of the rod 22 as shown in FIG. 13. The rocker 70 will, of course, move slightly against spring 80 as the projection $54a$ clears the arm $70b$ but the striker 75 will remain against the end of the rod even after the disengagement of the pushbutton and the rocker as shown in FIG. 13. In this form of the signal generator the springs 110 and 111 impart sufficient friction that the rocker 70 may be in a stable or rest position as illustrated in either FIGS. 13 or 14. FIG. 14 shows the rest position of the rocker 70 and striker 75 after the striker has given the rod a single blow and before the pushbutton has returned to its normal position. FIG. 13 shows a stable or rest position of the rocker 70 and striker 75 after the pushbutton is returned to its normal position and the rocker has been moved slightly in its slot mounting.

Accordingly, it may be seen that the signal generator apparatus of the present invention incorporates an improved striker mechanism requiring but few component parts of relatively non-critical construction. It should be obvious that more than one striker mechanism and radiator rod may be used to perform several functions with signals of different frequencies. In addition, the mechanism is constructed and operable in such a way that the parts may have improved useful operating life, but yet the overall apparatus can provide a strong, high energy output signal. Furthermore, without the need for additional component parts, the signal generator provides a controllable and fully effective damping provision for regulating the duration of the output signal.

I claim:

1. A supersonic signal generator including in combination, a housing and support means, a sonic radiator mounted on said support means and having a striking surface adapted to be impinged for production of a supersonic signal to be radiated externally of said housing, operating means mounted on said support means and manually movable between first and second positions, first spring means biasing said operating means to the first position thereof, a rocker lever having first and second end portions and a striker on said first end portion, means pivotally and slidably mounting said rocker lever intermediate the ends thereof so that said rocker lever is pivotal to permit said striker to impinge said striking surface and so that said rocker lever is slidable with respect to said operating means, the second end portion of said rocker lever being disposed to be engaged and disengaged by said operating means moving between said first and second positions for cocking and release of said rocker lever, second spring means engageable with said rocker lever for slidably urging said rocker lever toward said operating means and for pivotally urging said striker toward said striking surface upon disengagement of said operating means and said rocker lever for energizing said radiator by said striker, and third spring means pivotally urging said rocker lever to a position spacing said striker from said striking surface with said operating means in second position and disengaged from said rocker lever, said operating means and said second end of said rocker lever each having rigid engageable portions with rounded surfaces engageable upon movement of said operating means from said second position to said first position to cause slidable movement of said rocker lever away from said operating means to permit repositioning of said operating means by said first spring means.

2. A manually operable sonic generator including in combination, support means, sonic radiator means carried by said support means and having a striking surface, rocker means pivotally and slidably mounted on said support means and having a striker portion aligned with said striking surface, actuating lever means pivotally carried by said support means and including a rigid actuator portion engageable and disengageable with said rocker means for pivotally cocking and releasing said rocker means upon forward movement of said lever means, a flat spring secured to said support means for urging said striker portion into striking engagement with said striking surface upon release of said rocker means, said actuator portion and said rocker means having rounded portions to provide sliding movement of said rocker means away from said lever means upon return movement thereof and re-engagement of said actuator portion and said rocker means, means pivoting said striker portion into engagement with said striking surface upon sliding movement of said rocker means, and a coil spring biasing said rocker means against said flat spring to reduce recontact of said striker portion with said striking surface.

3. A manually operable sonic generator including in combination, support means, sonic radiator means carried by said support means and having a striking surface, actuating lever means pivotally mounted on said support means and including a rigid actuator portion, rocker means having first and second arm portions extending therefrom and striker means disposed on said first arm portion, mounting means intermediate said arm portions for pivotally supporting said rocker means on said support means, said mounting means including an elongated opening substantially in alignment with the pivotal mounting of said lever means to permit slidable motion of said second arm portion toward and away from said lever means, relatively strong spring means engageable with said rocker means and pivotally urging said second arm portion toward said actuator portion and pivotally urging said striker means toward said striking surface, relatively weak spring means to urge said first arm portion away from said striking surface, further spring means for biasing said actuating lever means to a position such that said actuator portion and said second arm portion are disengaged, said actuator portion and said second arm portion having respective mating surfaces to provide frictional engagement therebetween and pivotal movement of said rocker means for cocking the same against said strong spring means and release of said rocker means for striking action upon operation of said lever means against said further spring means, said weak spring limiting the striking action to a sharp blow, said actuator portion and said second arm portion having engageable rounded surfaces for shifting said rocker means in said elongated opening upon pivotal movement of said lever means by said further spring means, and said strong spring means having means forming a pivot point for said first arm portion upon shift of said rocker means to pivot said striker means into engagement with said striking surface to damp the signal of said radiator means.

4. A manually operable sonic generator including in combination, support means, sonic radiator means carried by said support means and having a striking surface, rocker means pivotally and slidably mounted on said support means and having a striker portion aligned with said striker surface, actuating lever means pivotally carried by said support means and including a rigid actuator portion engageable and disengageable with said rocker means for pivotally cocking and releasing said rocker means upon forward movement of said lever means, spring means engageable with said striker portion to urge the same into striking engagement with said striker surface upon release of said rocker means, means including second spring means holding said rocker means spaced from said radiator means and against said first spring means with said lever means and rocker means released, said actuator portion and said rocker means re-engaging upon return movement of said lever means and having rounded portions to provide sliding movement of said rocker means away from said lever means, and said spring means engaging said rocker means for pivoting action of said striker portion into engagement with said striking surface upon such sliding movement of said rocker means.

5. A manually operable sonic generator including in combination support means, sonic radiator means carried by said support means and having a striking surface, rocker means pivotally and slidably mounted on said support means and having a striker portion aligned with said striking surface, an actuating lever pivotally carried by said support means and including actuator portion rigid with respect to said lever and engageable and disengageable with said rocker means for pivotally cocking and releasing said rocker means upon forward movement of said actuating lever means, a first spring for biasing said actuating lever against forward movement thereof, a second spring for biasing said rocker means toward said actuator portion whereby said second spring may urge said striker portion into striking engagement with said striking surface upon release of said rocker means, means for limiting said striking engagement to a single impact with said lever released from said rocker means, said actuator portion and said rocker means re-engaging upon release of said lever to cause sliding movement of said rocker means and resetting of said generator, one of said springs including an extension engageable with said rocker means for maintaining said striker portion engaged with said striking surface in an unoperated condition of said actuating lever means.

6. A manually operable sonic generator including in combination support means, radiator means carried by said support means and having a striking surface, rocker means pivotally and slidably mounted on said support means and having a striker portion aligned with said striker surface, actuating lever means pivotally carried by said support means and including a rigid actuator portion engageable and disengageable with said rocker means for pivotally cocking and releasing said rocker means upon forward movement of said actuating lever, and spring means urging said striker portion into striking engagement with said striker surface upon release of said rocker means and providing a spaced relationship between said striker portion and said striking surface after such striking engagement with said lever means and rocker means released, said actuator portion and said rocker means having rounded portions to provide sliding movement of said rocker means away from said lever means upon return movement thereof, said spring means urging said striker portion into engagement with said striking surface upon sliding movement of said rocker means, and means for maintaining said striker portion engaged with said striking surface with said lever means in return position.

7. A manually operable sonic generator, including in combination, support means, an elongated sonic radiator carried by said support means and having a striking surface, rocker means pivotably and slidably mounted on said support means spaced outwardly from said striking surface and having a striker portion aligned with said striking surface, said rocker means further having an arm portion extending along and spaced from a side of said elongated radiator, a manually operable lever pivotally carried by said support means in a position spaced from the side of said elongated radiator and including an integral rigid actuator portion engageable and disengageable with said arm portion of said rocker means for pivotally cocking and releasing said rocker means upon forward movement of said lever, spring means urging said striker portion into engagement with said striking surface upon release of said rocker means, means for limiting said engagement of said striker portion and said striking surface to a single impact with said lever and said rocker means released, said actuator portion and said arm portion re-engaging upon return movement of said lever to cause sliding movement of said rocker means away from said lever, and means engaging said rocker means for pivoting of said striker portion into engagement with said striking surface upon such sliding movement of said rocker means for damping vibration of said sonic radiator.

8. A manually operable sonic generator, including in combination, a sonic radiator to be struck for excitation thereof, movable striker means having a portion movable away from and against said radiator, a first spring urging said striker portion toward said radiator, a second spring for urging said striker portion away from said radiator, spring biased, manually operable means engageable with said striker means to move the same against said first spring and release said striker means so that said first spring drives said striker portion into impact with said radiator and so that energy is stored in said second spring, said second spring limiting engagement of said striker portion and said radiator to a single blow, and means engaging said striker means to overcome said second spring and retain said striker means in contact with said radiator with said manually operable means in rest position.

9. A manually operable sonic generator, including in combination, a sonic radiator to be struck for excitation thereof, pivotally mounted rocker means having a striker movable away from and against said radiator, a spring biased actuating lever manually pivotable between first and second positions and spring biased to first position, striker energizing means including a first spring for driving said striker against said radiator and means coupling said lever to said rocker means so that pivotal movement of said lever from said first position to said second position stores energy in said first spring and causes release of the same to drive said striker against said radiator, means for limiting the impingement of said striker against said radiator to a single impact including a compression spring engaging said rocker means and in which energy is stored upon drive of said rocker means by said first spring to be released upon rebound of said striker from said radiator, said striker energizing means providing recocking of said actuating lever through spring biased movement thereof from said second position to said first position.

References Cited by the Examiner

UNITED STATES PATENTS

| | | | |
|---|---|---|---|
| 1,410,638 | 3/22 | Aronson | 46—10 |
| 2,920,604 | 1/60 | McDonald | 116—137 |
| 3,028,832 | 4/62 | Lazzery | 116—137 |

LOUIS J. CAPOZI, *Primary Examiner.*